(12) United States Patent
Shepler et al.

(10) Patent No.: US 9,669,489 B2
(45) Date of Patent: Jun. 6, 2017

(54) METHODS OF REPAIRING INTEGRALLY BLADED ROTORS

(71) Applicant: UNITED TECHNOLOGIES CORPORATION, Farmington, CT (US)

(72) Inventors: Robert E Shepler, South Windsor, CT (US); Nathan D Korn, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 216 days.

(21) Appl. No.: 14/701,164

(22) Filed: Apr. 30, 2015

(65) Prior Publication Data

US 2015/0328717 A1 Nov. 19, 2015

Related U.S. Application Data

(60) Provisional application No. 61/000,313, filed on May 19, 2014.

(51) Int. Cl.
*B23K 26/00* (2014.01)
*B23K 31/02* (2006.01)
(Continued)

(52) U.S. Cl.
CPC .......... *B23K 26/342* (2015.10); *B22F 3/1055* (2013.01); *B22F 3/24* (2013.01); *B22F 5/04* (2013.01); *B22F 7/062* (2013.01); *B23K 26/0012* (2013.01); *B23K 26/0069* (2013.01); *B23K 26/356* (2015.10); *B23K 31/025* (2013.01); *B23P 6/002* (2013.01); *F01D 5/005* (2013.01); *F01D 5/02* (2013.01); *B23K 2201/001* (2013.01); *B23K 2203/26* (2015.10); *C21D 10/005* (2013.01); *C22F 1/10* (2013.01); *C22F 1/183* (2013.01); *F01D 5/34* (2013.01); *F05D 2220/32* (2013.01); *F05D 2230/10* (2013.01); *F05D 2230/30* (2013.01);
(Continued)

(58) Field of Classification Search
CPC ............ B23K 26/0069; B23K 26/0012; B23K 31/025; F01D 5/02; F05D 2220/32; F05D 2230/10; F05D 2230/30; F05D 2230/80
USPC ....... 219/121.64, 121.85; 228/119; 29/889.1; 416/241 R
See application file for complete search history.

(56) References Cited

U.S. PATENT DOCUMENTS

| 5,846,057 A | 12/1998 | Ferrigno et al. | |
|---|---|---|---|
| 6,238,187 B1 * | 5/2001 | Dulaney | B23P 6/005 |
| | | | 416/223 R |
| 2009/0313823 A1 * | 12/2009 | Rockstroh | B23P 6/007 |
| | | | 29/889.1 |

FOREIGN PATENT DOCUMENTS

| EP | 0 933 438 A1 | 8/1999 |
|---|---|---|
| EP | 2 520 762 A1 | 11/2012 |

OTHER PUBLICATIONS

European Search Report for Application No. 15 16 7754 dated Oct. 19, 2015.

* cited by examiner

*Primary Examiner* — Samuel M Heinrich
(74) *Attorney, Agent, or Firm* — Cantor Colburn LLP

(57) ABSTRACT

A method of repairing an integrally bladed rotor includes removing a portion of the integrally bladed rotor to create a void in an airfoil, completely filling the void with a single replacement material, and laser shock peening the replacement material. Laser shock peening the replacement mate- (Continued)

rial imparts mechanical properties in the replacement material substantially the same as those in the forged material.

16 Claims, 6 Drawing Sheets

(51) Int. Cl.
*F01D 5/02* (2006.01)
*B23K 26/342* (2014.01)
*F01D 5/00* (2006.01)
*B23K 26/356* (2014.01)
*B23P 6/00* (2006.01)
*B22F 3/105* (2006.01)
*B22F 3/24* (2006.01)
*B22F 5/04* (2006.01)
*B22F 7/06* (2006.01)
*C21D 10/00* (2006.01)
*F01D 5/34* (2006.01)
*B23K 101/00* (2006.01)
*B23K 103/18* (2006.01)
*C22F 1/10* (2006.01)
*C22F 1/18* (2006.01)

(52) U.S. Cl.
CPC ......... *F05D 2230/80* (2013.01); *Y02P 10/295* (2015.11); *Y02T 50/673* (2013.01)

METHODS OF REPAIRING INTEGRALLY BLADED ROTORS

CROSS-REFERENCE TO RELATED APPLICATION

This application claims the benefit of priority under 35 U.S.C. §119(e) to U.S. Provisional Application No: 61/000, 313, filed May 19, 2014, which is incorporated herein by reference in its entirety.

BACKGROUND OF THE INVENTION

1. Field of the Invention

The present disclosure relates to gas turbine engines, and more particularly to repair of gas turbine engine components.

2. Description of Related Art

Gas turbine engines like those used to power aircraft or for industrial applications generally include a compressor for pressurizing a supply of air, a combustor for burning a hydrocarbon fuel in the presence of the pressurized air, and a turbine for extracting energy from the resultant combustion gases. The compressor and the turbine modules generally include one or more stages. Each stage typically includes a rotor disk with a plurality of blades. Conventional rotor disks are typically either slotted disk rotors or integrally bladed rotors. Slotted disk rotors generally include disk slots that receive corresponding dovetail or fir-tree shaped blade roots. Integrally bladed rotors are typically machined from an oversized rotor disk forging and include blades metallurgically joined to the disk or solid state welded to a rotor disk.

There are different tradeoffs and advantages to using integrally bladed rotors versus slotted disk rotors, and engine manufacturers can choose either based on the needs for a specific application. For instance, integrally bladed rotors are more structurally efficient than slotted disk rotors. This allows for construction of more compact engines with smaller core diameters. Integrally bladed rotors also lack the joints formed between dovetail or fir tree blade roots and surrounding slot in slotted disk assemblies.

One challenge for engine designs incorporating integrally bladed rotors is repairing blade damage. During field use, foreign object debris can nick or otherwise damage leading edges, trailing edges, tips, and/or tip corners of the integrally bladed disk airfoils. This can decrease compressor performance and/or pose a possible risk of further cracking during service if not repaired. Since welding a forged material like an integrally bladed rotor can result in degraded mechanical properties in the weld material in relation to the base material, conventional repair processes generally use a blending process. While generally successful in reducing stress risers associated with such damage, conventional blending processes are generally limited to airfoil portions with relatively small amounts of damage. Repairing airfoil portions with larger damaged areas can be more difficult due to the complex shape of the integrally bladed rotor as well as the challenges of restoring the mechanical properties in the repaired area using conventional repair methods.

Such conventional methods and systems have generally been considered satisfactory for their intended purpose. However, there is still a need in the art for improved systems and methods of repairing damaged portions of integrally bladed rotors. The present disclosure provides a solution for this need.

SUMMARY OF THE INVENTION

A method of repairing an integrally bladed rotor includes removing a portion of the integrally bladed rotor to create a void in an airfoil of the integrally bladed rotor, filling the void with replacement material, and laser shock peening the replacement material. Laser shock peening the replacement material imparts residual compressive stress in the replacement material.

In certain embodiments, airfoil can include a forged portion. The airfoil can also include no forged portion. Laser shock peening the replacement portion can include laser shock peening both high-pressure and low-pressure sides of the airfoil. Laser shock peening can include forming a compressive layer spanning from a high-pressure side to a low-pressure side of the airfoil. The laser shock peening can include imparting residual compressive stress into the replacement material with a magnitude substantially equivalent to or greater than that of an undamaged portion of the airfoil. The laser shock peening can also include imparting residual compressive stress into the replacement material with a depth substantially equivalent to or greater than that of the undamaged portion of the airfoil.

Conventional blade repair processes typically involve a forging or coining operation to improve the mechanical properties of the repaired portion of the blade. Forging or coining operations can improve the mechanical properties of the repaired portion of the blade by cold working the material. Such cold working can cause compression and flow of the material, thereby imparting mechanical properties similar to those of a forged material. However, because of the geometric constraints of integrally bladed rotors, it is generally not possible to use closed dies to apply force to the repaired blade portion of an integrally bladed rotor. Laser shock peening is an alternative method of imparting energy to the repaired portion of an integrally bladed rotor, thereby developing a layer of residual compressive stress in the repaired portion without requiring the use of closed dies in a forging or coining operation. The properties of the resultant layer of residual compressive stress are not necessarily equivalent to those achieved with a forging or coining operation, but can improve the fatigue properties of the repair zone such that the expected fatigue life of the repaired portion is comparable to that of the remaining, e.g. undamaged, portion of the integrally bladed rotor.

In accordance with certain embodiments, the method can include creating a heat-affected zone in a portion of the airfoil adjacent to the replacement portion. Laser shock peening can include laser shock peening both the replacement material and the heat-affected zone. Laser shock peening can impart residual compressive stress in the heat-affected zone with magnitude substantially equivalent to or greater than that of an undamaged portion of the airfoil. The laser shock peening can also impart residual compressive stress in the heat-affected zone with a depth substantially equivalent to or greater than that of the undamaged portion of the airfoil.

It is also contemplated that in certain embodiments removing a portion of the integrally bladed rotor can include removing a portion of a leading edge of the airfoil. The removed portion can include damage associated with foreign object ingestion into a gas turbine engine. It is further contemplated that filling the void can include adding replacement material using a low-heat additive manufacturing or laser welding process, for example. The method can also include shaping the replacement material to conform to a predetermined airfoil contour.

An integrally bladed rotor includes a rotor disk, a plurality of rotor blades extending from the rotor disk, and an airfoil portion. In embodiments, the airfoil includes a forged portion, a replacement portion, and a transition portion extending between the forged portion and the replacement portion. The replacement portion has a different metallurgical microstructure than the forged portion and residual compressive stress in the replacement portion and the transition portion is substantially equivalent to or greater than residual compressive stress in the forged portion.

In certain embodiments, the residual compressive stress in the replacement portion can extend to a depth that is substantially equivalent to or greater than a depth of the residual compressive stress in the forged portion. The residual compressive stress in the transition portion can also extend to a depth that is substantially equivalent to or greater than the depth of the residual compressive stress in the forged portion. It is further contemplated that the replacement portion can define a low-pressure surface and a high-pressure surface of an airfoil. The transition portion can be a heat-affected zone.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
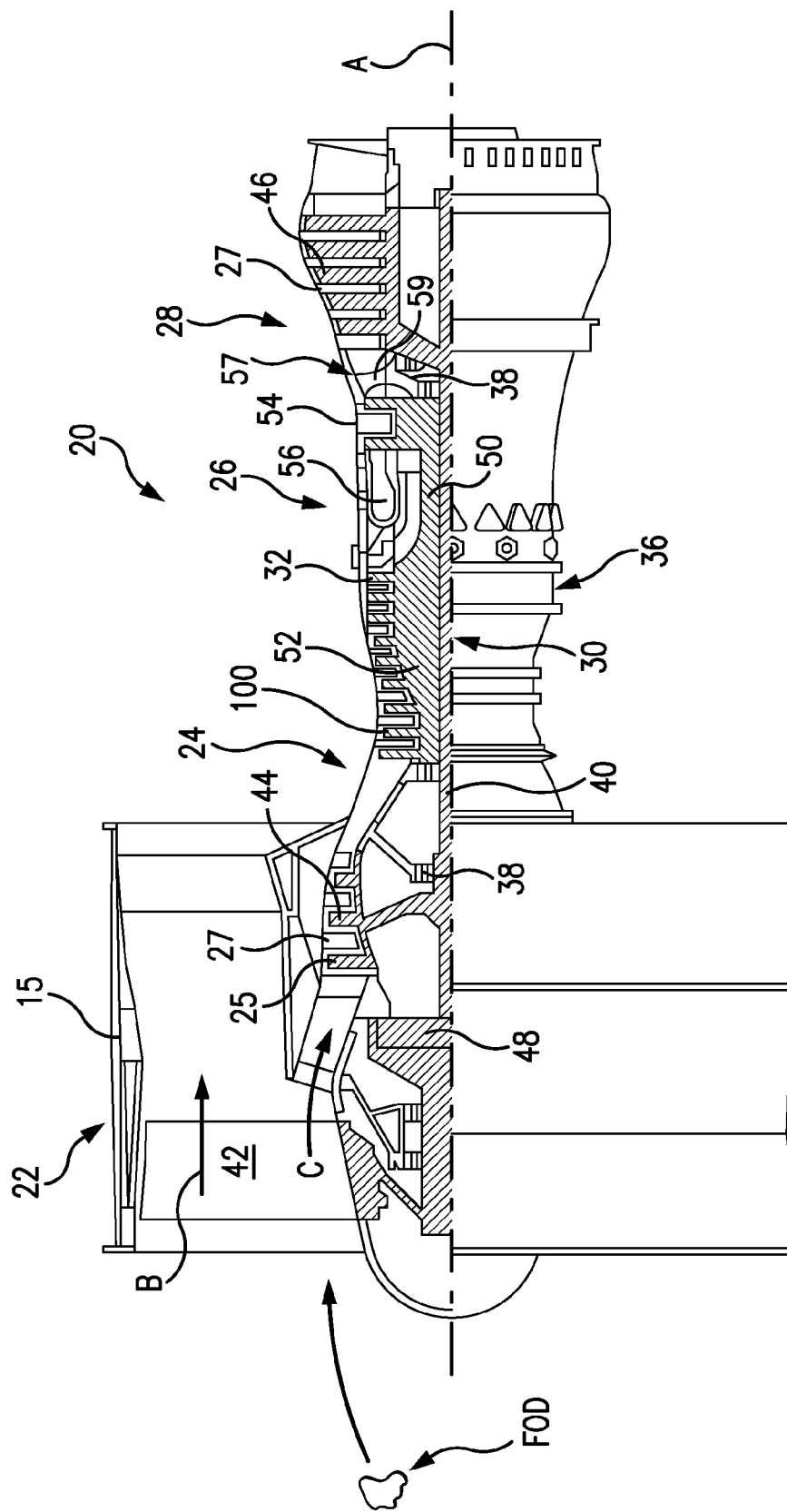
FIG. 1 is a schematic side view of an exemplary embodiment of a gas turbine engine, showing an integrally bladed rotor in accordance with the present disclosure.

Reference will now be made to the drawings wherein like reference numerals identify similar structural features or aspects of the subject disclosure. For purposes of explanation and illustration, and not limitation, a partial view of an exemplary embodiment of the integrally bladed rotor in accordance with the disclosure is shown in FIG. 1 and is designated generally by reference character 100. Other embodiments of the integrally bladed rotor in accordance with the disclosure, or aspects thereof, are provided in FIGS. 2-6, as will be described. The systems and methods described herein can be used in gas turbine engine compressor and turbine sections.

With reference to FIG. 1, schematically illustrates a gas turbine engine 20. Gas turbine engine 20 is disclosed herein as a two-spool turbofan that generally incorporates a fan section 22, a compressor section 24, a combustor section 26 and a turbine section 28. Other engines might include an augmenter section (not shown) among other systems or features. Fan section 22 drives air along a bypass flow path B in a bypass duct defined within a nacelle 15, while the compressor section 24 drives air along a core flow path C for compression and communication into combustor section followed by expansion through turbine section 28. Although depicted as a two-spool turbofan gas turbine engine in the disclosed non-limiting embodiment, it should be understood that the concepts described herein are not limited to use with two-spool turbofans as the teachings may be applied to other types of engines including three-spool engine architectures.

Gas turbine engine 20 generally includes a low-speed spool 30 and high-speed spool 32 mounted for rotation about an engine central longitudinal axis A relative to an engine static structure 36 via bearings 38. It should be understood that bearings 38 at multiple locations may alternatively or additionally be provided, and location of bearings 38 are as appropriate to the application.

Low-speed spool 30 generally includes an inner shaft 40 that interconnects a fan 42, a low-pressure compressor 44 and a low-pressure turbine 46. Inner shaft 40 is connected to fan 42 through a geared architecture 48 configured for driving fan 42 at a lower speed than low-speed spool 30. High-speed spool 32 includes an outer shaft 50 that interconnects a high-pressure compressor 52 and a high-pressure turbine 54. A combustor 56 is arranged in exemplary gas turbine engine 20 between high-pressure compressor 52 and high-pressure turbine 54. Inner shaft 40 and outer shaft 50 are concentric and rotate via bearings 38 about engine central axis longitudinal axis A which is collinear with their longitudinal axes.

Low-pressure compressor 44 compresses the core airflow as it transits low-pressure compressor 44. The core airflow is communicated to high-pressure compressor 52, which further compresses the core airflow and communicates it to combustor 56. Fuel is mixed with the core airflow in combustor 56 and the mixture ignited, further increasing the core airflow pressure. These high-pressure combustion products are then expanded by high-pressure turbine 54 and low-pressure turbine 46.

Each of compressor section 24 and turbine section 28 may include alternating rows of rotor assemblies and vane assemblies (shown schematically). For example, the rotor assemblies can carry a plurality of rotating blades 25, while each vane assembly can carry a plurality of vanes 27 that extend into core flow path C. Blades 25 may either create or extract energy in the form of pressure from the core airflow as the airflow is communicated along core flow path C. Vanes 27 direct core airflow to blades 25 to either add or extract energy.

Figure 2:
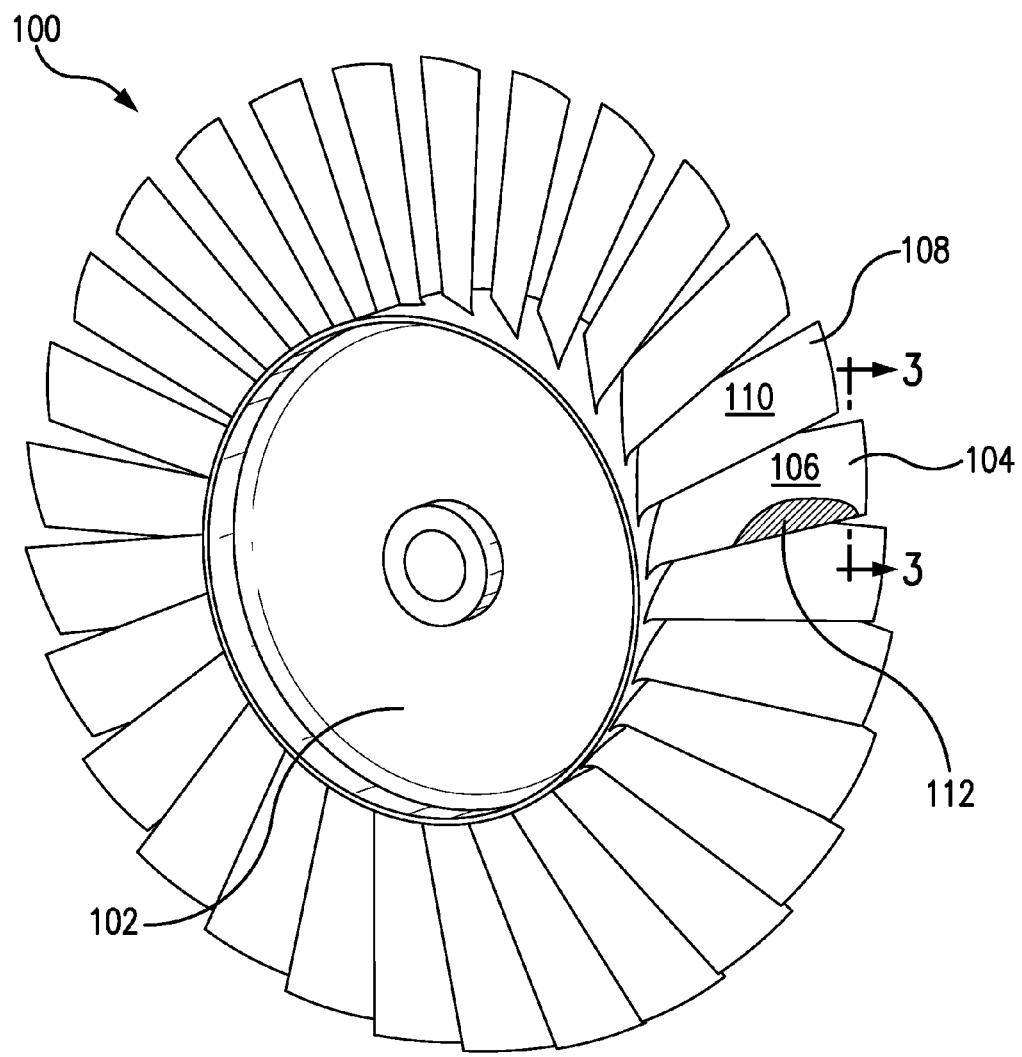
FIG. 2 is a perspective view of an integrally bladed rotor, showing a blade including a replacement portion.

With reference to FIG. 2, integrally bladed rotor 100 is shown. Integrally bladed rotor 100 includes a rotor disk 102, a first rotor blade 104 with a forged portion 106 including an airfoil, and a second rotor blade 108 with a forged portion 110 including an airfoil. Forged portion 106 is similar to forged portion 110 and additionally includes a replacement portion 112 formed from a replacement material. Integrally bladed rotor disk 100 is a forged integrally bladed rotor constructed from a material including titanium, nickel alloy, or any other suitable material. Replacement portion 112 is formed from a single welded material and has a structure with at least one characteristic of a cast material, such as metallurgical microstructure different from the forged material from which integrally bladed rotor 100 is constructed. As illustrated, integrally bladed rotor 100 is a low-pressure compressor rotor and is formed from a nickel-containing alloy, a titanium alloy, or any other suitable alloy. In certain embodiments, integrally bladed rotor 100 is a high-pressure compressor rotor including a nickel-containing alloy, a titanium alloy or other suitable alloy.

Figure 3:
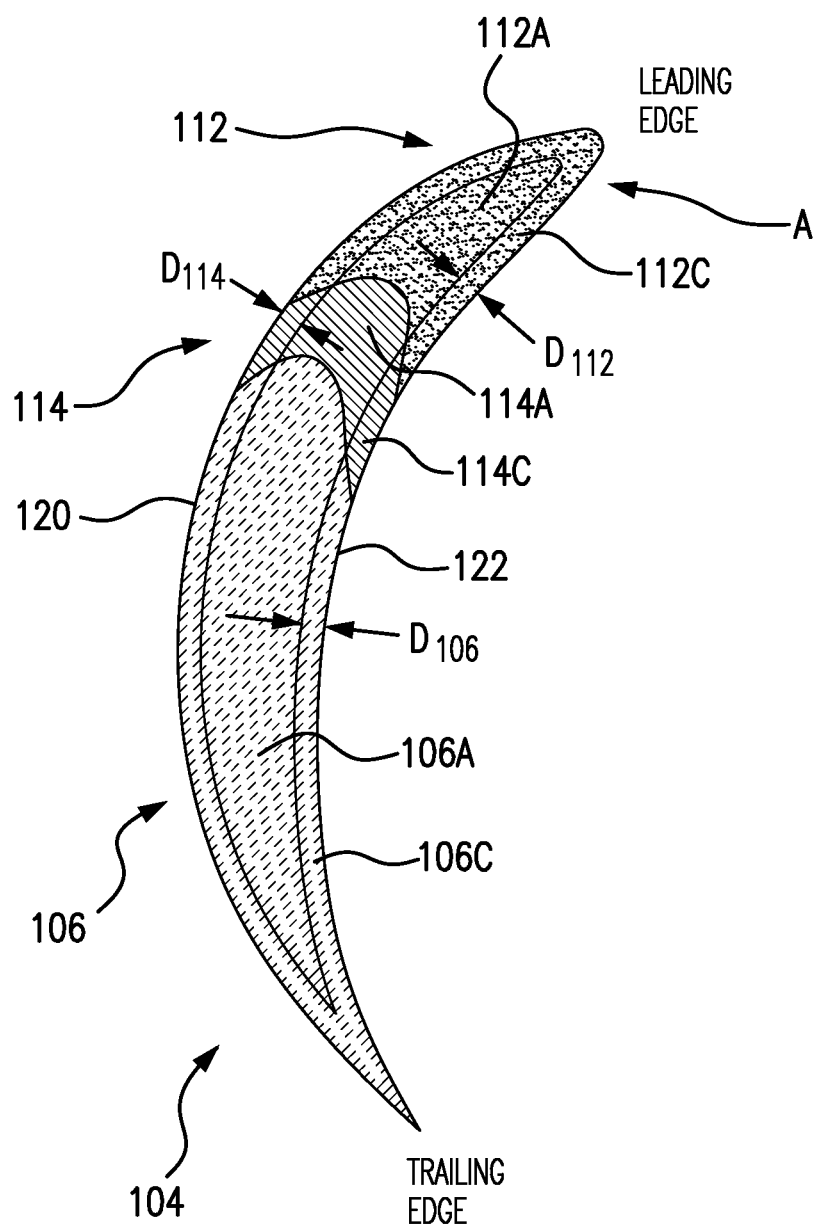
FIG. 3 is a cross-sectional view of the blade of FIG. 2, showing the replacement portion, transition portion and forged portion of the blade, according to an embodiment.

With reference to FIG. 3, first rotor blade 104 is shown in cross-section. First rotor blade 104 has an exterior surface defining a low-pressure face 120 and an opposed high-pressure face 122 each extending between a leading edge and a trailing edge of first rotor blade 104. First rotor blade 104 includes three regions with different processing histories but with substantially the same mechanical properties, namely forged portion 106, a transition portion 114, and replacement portion 112. Forged portion 106 includes native material that is in substantially the same state as when integrally bladed rotor 100 was originally forged. Its mechanical properties and microstructure are accordingly substantially unchanged. Transition portion 114 includes base material that positioned when integrally bladed rotor 100 was originally forged and which has been exposed to subsequent thermal processing, such as a heat-affected zone created in a material due to proximity to a welding process. Replacement portion 112 includes material added to first rotor blade 104 subsequent to the native material comprising forged portion 106 being formed. It is contemplated that replacement portion 112 includes welded material having a different metallurgical microstructure than forged portion 106. In embodiments, substantially all of replacement portion 112 is formed from welded material with a different metallurgical microstructure than forged portion 106. Transition portion 114 is formed by the heat from the welding process for replacement portion 112 and has a metallurgical microstructure different from replacement portion 112 and forged portion 106.

Each of forged portion 106, transition portion 114 and replacement portion have a residual compressive stress region of predetermined depth in magnitude. In this respect forged portion 106 has a residual compressive stress region 106C with a depth $D_{106}$, transition portion 114 has a residual compressive stress region 114C with a depth $D_{114}$, and replacement portion 112 has a residual compressive stress region 112C with a depth $D_{112}$. It is contemplated that residual compressive stress is such that mechanical properties of forged portion 106, transition portion 114, and replacement portion 112 are substantially equivalent, such as by manipulating transition portion 114 and replacement portion 112 with additional processing subsequent to incorporating replacement portion 112 to first rotor blade 104. For example, in embodiments the depth $D_{106}$, depth $D_{114}$, and depth $D_{112}$ are equivalent or scaled with respect to one another such that residual compressive stress results in acceptable mechanical properties in transition portion 114 and replacement portion 112. This can restore the expected fatigue life of first rotor blade 104 to match that of second rotor blade 108 (shown in FIG. 2) subsequent to foreign object or debris (FOD) ingestion by gas turbine engine 10 (shown in FIG. 1). It is to be understood that the desired depth of the residual stress will depend on the airfoil geometry and that mechanical properties required for the replacement portion (and, in embodiments, the transition portion) to meet the durability requirements of the integrally bladed disk. These will vary depending on the design stress, material, and operating environment of the integrally bladed rotor.

Figure 4:
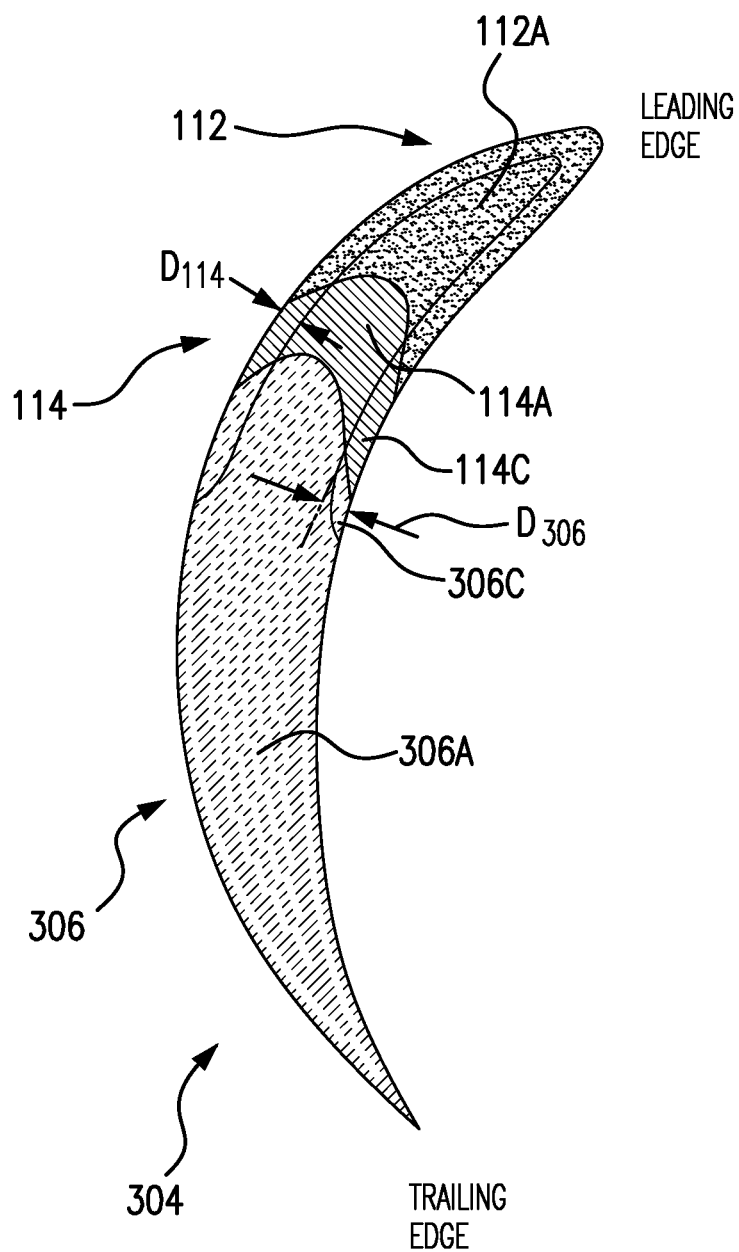
FIG. 4 is a cross-sectional view of another blade, showing the replacement portion, transition portion and forged portion of the blade, according to another embodiment.

With reference to FIG. 4, another embodiment a rotor blade 304 of an integrally bladed rotor disk is shown. Rotor blade 304 is similar to first rotor blade 104 with the difference that forged portion 306 does not include a region of compressive stress as originally manufactured. Instead, as illustrated in FIG. 4 with region of compressive stress 306C, only a portion of forged portion 306 is laser shock peening, a depth $D_{306}$ of region of compressive stress 306C tapering to a progressively more shallow depth along a length of forged portion 306.

Welding a forged material such as integrally bladed rotor 100 typically degrades the mechanical properties of base material in vicinity of the weld. For that reason, conventional wisdom is to weld as little as possible in repairing forged engine components. This generally precludes restoring large portions of blades and/or blade airfoils solely by building up welded material as welded material typically have mechanical properties more similar to castings than forgings.

Laser shot peening can provide a much deeper mechanically deformed (compressive) layer than traditional shot peening methods. This allows for improving the mechanical properties of the added weld material by imparting residual compressive stress substantially the same or greater than the adjacent base material. This provides residual compressive stress regions with sufficient depth to restore mechanical properties in integrally bladed rotors. It can also provide a region of residual compressive stress, i.e. region A of first rotor blade 104 shown in FIG. 3, that extends through substantially the entire thickness of the transition portion and the repaired portion of an airfoil, making a mechanically acceptable repair of integrally bladed rotors used in the upper stages of high-pressure compressor 52 (shown in FIG. 1). This allows for repair of integrally bladed rotors used in high-pressure compressor, low-pressure compressor, high-pressure turbine, and/or low-pressure turbine. It can also be used to repair to individual blades.

Figure 5:
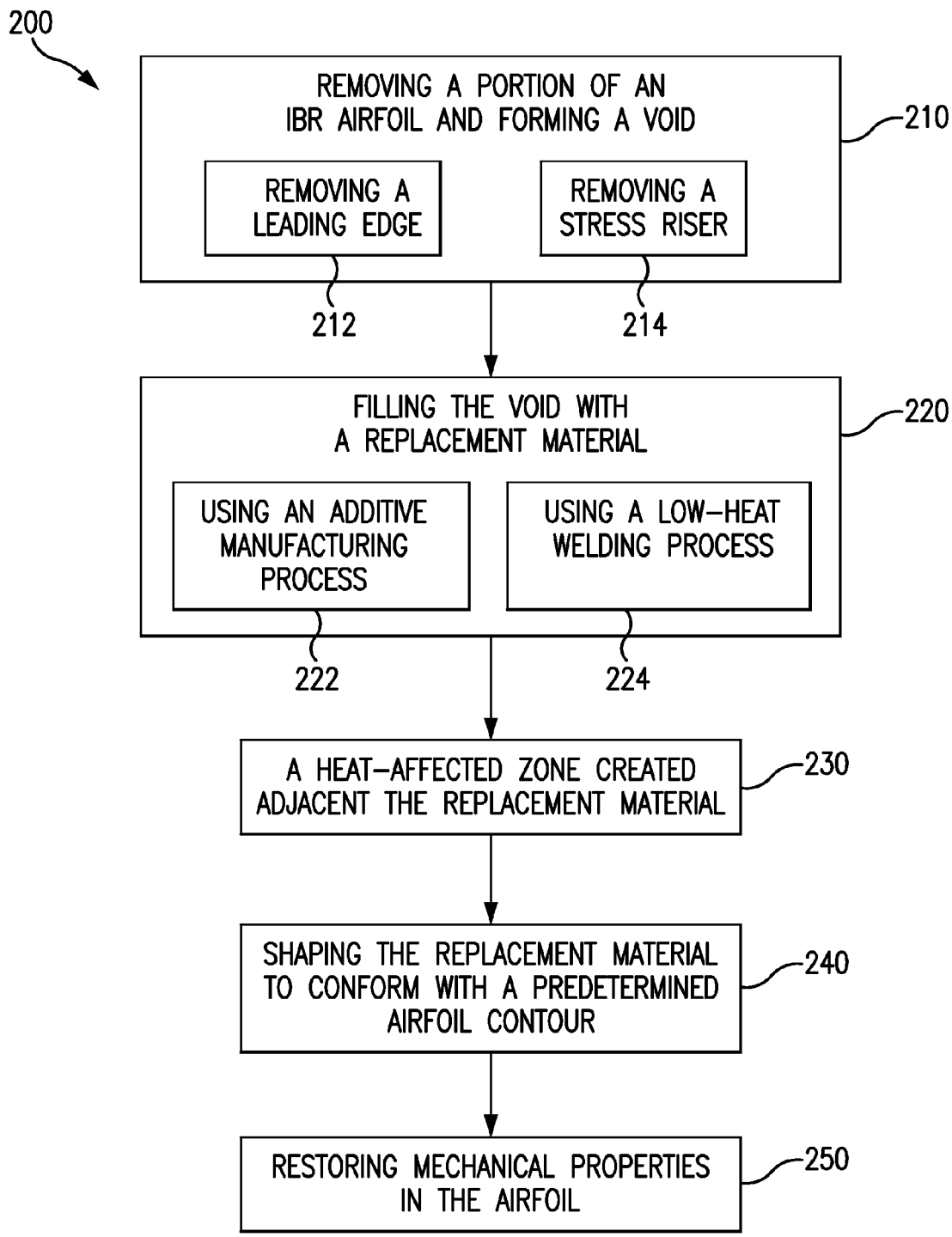
FIG. 5 is a process flow diagram of a method of repairing an integrally bladed rotor, showing a mechanical deformation operation.

With reference to FIG. 5, a method 200 of repairing an integrally bladed rotor disk, e.g. integrally bladed rotor 100, is shown. Method 200 includes an operation 210 for removing a portion of the integrally bladed rotor and creating a void, e.g. the space occupied by replacement portion 112, therein. Method 200 further includes an operation 220 for filling the void with replacement material, e.g. replacement portion 112. Method 200 additionally addresses the heat-affected zone, e.g. transition portion 114, created adjacent to the replacement material by welding process 224 if used in operation 220. Operation 240 shapes the replacement material to conform to a predetermined airfoil contour, and an operation 250 restores desirable mechanical properties of the integrally bladed rotor.

Operation 210 can include an operation 212 for removing a leading edge of an airfoil of a rotor blade, e.g. first rotor blade 104. Operation 210 can also include an operation 214 for removing at least one stress riser from the airfoil. This allows for repairing FOD damage following a FOD ingestion event. It further allows for repairing FOD damage while restoring the intended aerodynamic contour of the airfoil and restoring the mechanical properties of the airfoil by removing artifacts within the damaged airfoil portion that could otherwise reduce the service life of the component. It can also restore the expected fatigue life of a forged component, e.g. integrally bladed rotor 100.

Operation 220 can include an operation 222 for adding replacement material using an additive manufacturing process to fill the void. Operation 220 can also include an operation 224 for adding replacement material using a low-input heat process, such as laser powder feed welding for example. Using a low-input heat laser welding or additive manufacturing processes can reduce collateral change in a portion of the base material adjacent the replacement material, e.g. transition portion 114. This can reduce the amount of mechanical deformation necessary to restore the mechanical properties of the heat-affected zone 114 of the blade.

Figure 6:
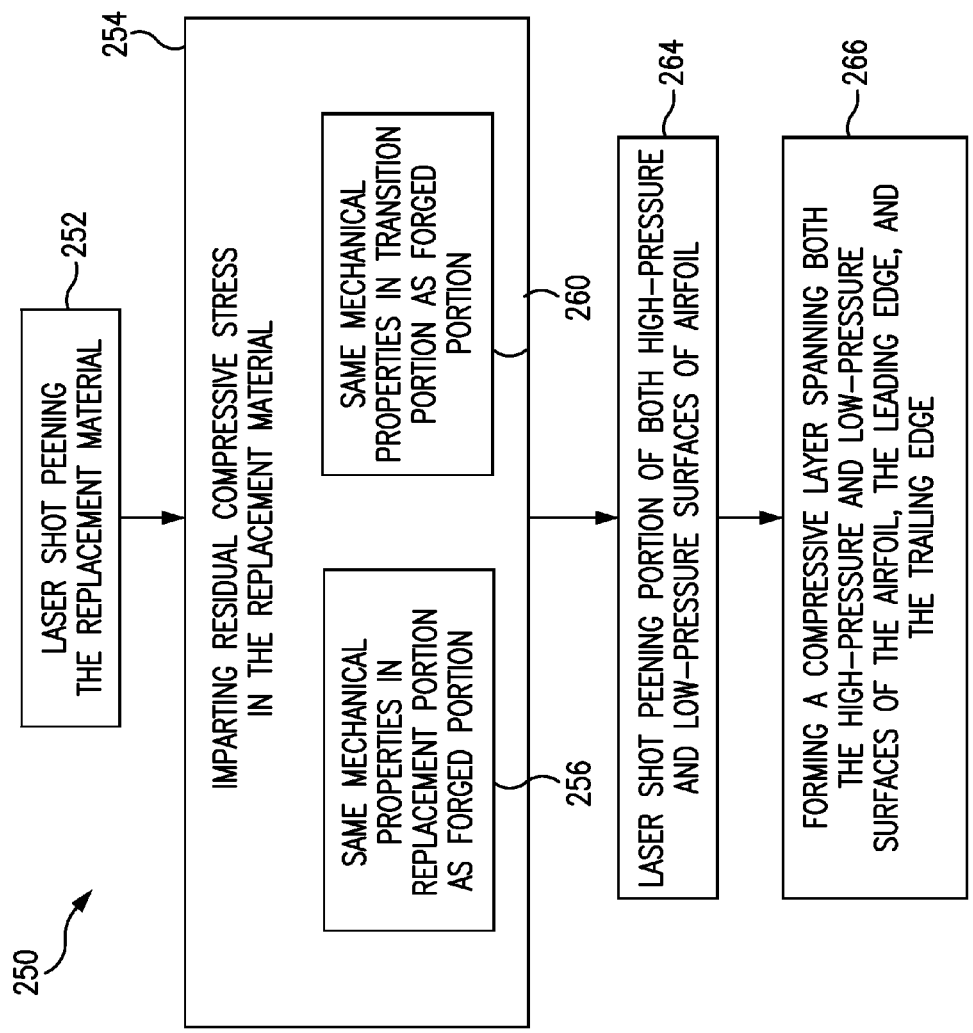
FIG. 6 is a process flow diagram the mechanical deformation operation of the method of FIG. 5, showing laser shock peening operation.

With reference to FIG. 6, operation 250 can include an operation 252 for restoring the mechanical properties of the integrally bladed rotor by laser shot peening at least one of the replacement portion and transition portion. Operation 250 can also include an operation 254 for imparting residual compressive stress into the replacement material using the laser shot peening process, such as by selectively deforming portions of the airfoil surface by directing laser light at a suitable prepared surface of the integrally bladed rotor. This can impart residual compressive stress of predetermined magnitude and depth into the integrally bladed rotor.

Operation 254 can further include an operation 256 for imparting substantially the same mechanical properties in the replacement portion as the forged portion and an operation 260 for imparting substantially the same mechanical properties in the transition portion and the forged portion. It is to be understood that the forged portion of the blade can be an undamaged portion of the blade. It is also to be understood that the transition portion can be a heat-affected zone of the blade.

Operation 250 can further include an operation 264 for laser shot peening both the high-pressure and low-pressure surfaces of the airfoil, e.g. low-pressure face 120 and high-pressure face 122. Operation 250 also includes an operation 266 for forming a compressive layer spanning both the high-pressure face and the low-pressure face of the airfoil as well as the leading and trailing edges of the blade. This can change the metallurgical properties of the replacement portion, making the mechanical properties of the replacement portion more closely resemble the mechanical properties of the base material of the forged portion.

The methods and systems of the present disclosure, as described above and shown in the drawings, provide methods for repairing integrally bladed rotors with superior properties including improved repair process capability. The improved repair process capability allows for recovery of a larger percentage of integrally bladed rotors with airfoil damage in leading edges, trailing edges, or tips by being able to add relatively large amounts of replacement material. The improved repair process capability can also impart mechanical properties in the replacement material similar to those in undamaged portions of the blade. The methods also allow for restoring mechanical properties in portions of the blade collaterally damaged when bonding the replacement material to the undamaged portion of the blade. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of repairing an integrally bladed rotor disk, comprising:
   removing a portion of a integrally bladed rotor airfoil, thereby creating a void in the airfoil;
   completely filling the void with a single replacement material; and
   laser shock peening the replacement material, thereby imparting residual compressive stress in the replacement material.

2. A method as recited in claim 1, wherein the step of laser shock peening includes laser shock peening both low-pressure and high-pressure sides of the airfoil.

3. A method as recited in claim 1, wherein imparting residual compressive stress includes forming a compressive layer spanning from a high-pressure side to a low-pressure side of the airfoil.

4. A method as recited in claim 1, further including the step of shaping the replacement material to conform the replacement material to a predetermined airfoil contour.

5. A method as recited in claim 1, wherein the step of laser shock peening includes imparting mechanical properties in the replacement material substantially the same as those of an undamaged portion of the airfoil.

6. A method as recited in claim 5, wherein the step of laser shock peening includes imparting mechanical properties in the transition portion substantially the same as those of the undamaged portion of the airfoil.

7. A method as recited in claim 1, further including creating a heat-affected zone in a portion of the airfoil adjacent to the replacement material, and wherein the step of laser shock peening includes laser shock peening the replacement material and the heat-affected zone.

8. A method as recited in claim 1, wherein the step of removing a portion of the integrally bladed rotor includes removing a stress riser.

9. A method as recited in claim 1, wherein the step of removing a portion of the integrally bladed rotor includes removing a portion of a leading edge of the airfoil.

10. A method as recited in claim 1, wherein filling the void with replacement material includes adding replacement material using a low-heat additive manufacturing process.

11. A method as recited in claim 1, wherein filling the void with replacement material includes adding material using a laser welding process to add the replacement material.

12. A method as recited in claim 1, wherein the step of removing a portion of the integrally bladed rotor includes removing damage associated with foreign object ingestion into a gas turbine engine.

13. A method of repairing an integrally bladed rotor disk, comprising:
   removing a portion of a forged integrally bladed rotor airfoil, thereby creating a void in the airfoil;
   completely filling the void with a single replacement material; and
   laser shock peening the replacement material, thereby imparting residual compressive stress in the replacement material.

14. An integrally bladed rotor disk, comprising:
   a rotor disk; and
   a rotor blade with an airfoil extending from the rotor disk, the airfoil including:
      a forged portion;
      a replacement portion having uniform mechanical properties; and
      a transition portion extending between the forged portion and the replacement portion, wherein mechanical properties in the replacement portion are substantially the same as those in the forged portion, and wherein mechanical properties in the transition portion are substantially the same as those in the forged portion.

15. An integrally bladed rotor as recited in claim 14, wherein the replacement portion defines a low-pressure surface and a high-pressure surface of an airfoil.

16. An integrally bladed rotor as recited in claim 14, wherein the transition portion is a heat-affected zone.

* * * * *